United States Patent
Chao

(10) Patent No.: US 6,693,910 B2
(45) Date of Patent: Feb. 17, 2004

(54) SYSTEM AND METHOD FOR AVOIDING STALL OF AN H-ARQ REORDERING BUFFER IN A RECEIVER

(75) Inventor: Yi-Ju Chao, Huntington Station, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/327,301

(22) Filed: Dec. 20, 2002

(65) Prior Publication Data
US 2004/0001456 A1 Jan. 1, 2004

Related U.S. Application Data
(60) Provisional application No. 60/392,403, filed on Jun. 28, 2002.

(51) Int. Cl.⁷ .......................... H04L 12/28; H03H 13/00
(52) U.S. Cl. ...................................... 370/394; 714/751
(58) Field of Search ................... 370/328, 338, 370/392, 394, 412, 465, 522; 714/746, 750, 752, 751, 758, 776

(56) References Cited

U.S. PATENT DOCUMENTS

| | | | | |
|---|---|---|---|---|
| 5,600,663 A | * | 2/1997 | Ayanoglu et al. ............ | 714/751 |
| 5,684,791 A | * | 11/1997 | Raychaudhuri et al. ...... | 370/280 |
| 5,701,312 A | * | 12/1997 | DeLuca et al. .............. | 714/748 |
| 5,768,533 A | * | 6/1998 | Ran ............................ | 709/247 |
| 5,946,320 A | * | 8/1999 | Decker ........................ | 370/428 |
| 6,134,694 A | * | 10/2000 | Uebayashi et al. .......... | 714/751 |
| 6,289,003 B1 | * | 9/2001 | Raitola et al. ............... | 714/748 |
| 6,438,723 B1 | * | 8/2002 | Kalliojarvi ................... | 714/751 |
| 6,519,731 B1 | * | 2/2003 | Huang et al. ................ | 714/751 |
| 6,604,216 B1 | * | 8/2003 | Javerbring et al. .......... | 714/751 |

OTHER PUBLICATIONS

IEEE, 00/98 "Wireless ATM MAC Protocol with combined Hybrid ARQ and Adaptive Scheduling", pp. 599–604, Songsong Sun et al.*

IEEE, 04/03 "Comparative Analysis of Hybrid ARQ Schemes For the Application of Multimedia Mobile Devices" 186–187, Yon, Ho Kim.*

IEEE, 05/03 Performance evaluation of some Hybrid ARQ schemes in IEEE 802.11a networks, pp. 2735–2739, Emilio et a.*

* cited by examiner

Primary Examiner—Min Jung
Assistant Examiner—Andy Lee
(74) Attorney, Agent, or Firm—Volpe and Koenig, P.C.

(57) ABSTRACT

A system and method for avoiding stall of an H-ARQ reordering buffer in a receiver is disclosed. The present invention reduces the latency of the H-ARQ reordering buffers within a receiver and uses a Last-In-First-Out (LIFO) policy for loading the transmitting H-ARQ processors. The LIFO loading policy increases the probability that the UE will be able to determine at an earlier time whether the missed TSN is due to delay in retransmission or due to the release of a transmission by the Node B by reading the new H-ARQ processor identifier (ID).

13 Claims, 6 Drawing Sheets

SYSTEM AND METHOD FOR AVOIDING STALL OF AN H-ARQ REORDERING BUFFER IN A RECEIVER

CROSS REFERENCE TO RELATED APPLICATION

This application claims priority from U.S. provisional application No. 60/392,403, filed on Jun. 28, 2002 which is incorporated by reference as if fully set forth.

FIELD OF INVENTION

The present invention is related to communication systems which use a hybrid automatic repeat request (H-ARQ) scheme for improving quality of service, (e.g. system throughput). More particularly, the present invention is directed to a system and method for reducing the latency of the H-ARQ reordering buffers within a receiver.

BACKGROUND

H-ARQ processing is a scheme comprising multiple parallel ARQ processors whereby each processor repeatedly transmits several sequential attempts of a data block until the transmission is successful to ensure that each block of data is received without an error. Referring to FIG. 1, a simplified flow diagram of the data flow between a Node B (shown at the bottom of FIG. 1) and a UE (shown at the top of FIG. 1) is shown. Protocol data units from higher level processing are scheduled and may be multiplexed into one data block. A data block can only contain protocol data units of higher layers of the same priority. A unique Transmission Sequence Number (TSN) is assigned to each data block by the scheduler. The higher layers may provide a plurality of streams of different priorities of protocol data units, each priority having a sequence of TSNs. The scheduler then dispatches the blocks to the plurality of H-ARQ processors $P1_B$–$P5_B$. Each H-ARQ processor $P1_B$–$P5_B$ is responsible for processing a single block of data at a time. For example, as shown in FIG. 1, the Priority 1 protocol data units comprise a sequence illustrated as $B1_1$–$B1_N$. Likewise, the Priority 2 protocol data units are sequenced from $B2_1$–$B2_N$ and the Priority 3 protocol data units are sequenced from $B3_1$–$B3_N$. These protocol data units are scheduled (and may be multiplexed) and affixed a TSN by the common scheduler. For purposes of describing the invention, we assume one protocol data unit for one data block. After a data block is scheduled to be processed by a particular processor $P1_B$–$P5_B$, each data block is associated with a processor identifier, which identifies the processor $P1_B$–$P5_B$ that processes the data block. It should be understood by those of skill in the art that this association may include "tagging" the data block or may comprise control channel signaling, whereby a control channel provides signaling from the Node B to the UE that a particular data block is associated with a particular transmit processor $P1_B$–$P5_B$. The data blocks are then input into the scheduled Node B H-ARQ processors $P1_B$–$P5_B$ which receive and process each data block. Each Node B H-ARQ processor $P1_B$–$P5_B$ corresponds to an H-ARQ processor $P1_{UE}$–$P5_{UE}$ within the UE. Accordingly, the first H-ARQ processor $P1_B$ in the Node B communicates with the first H-ARQ processor $P1_{UE}$ in the UE. Likewise, the second H-ARQ processor $P2_B$ in the Node B communicates with the second H-ARQ processor $P2_{UE}$ in the UE, and so on for the remaining H-ARQ processors $P3_B$–$P5_B$ in the Node B and their counterpart H-ARQ processors $P3_{UE}$–$P5_{UE}$ respectively within the UE. The H-ARQ processes are timely multiplexed onto the air interface and there is only one transmission of an H-ARQ on the air interface at one time.

For example, taking the first pair of communicating H-ARQ processors $P1_B$ and $P1_{UE}$, the H-ARQ processor $P1_B$ processes a data block, for example $B1_1$, and forwards it for multiplexing and transmitting it over the air interface. When this data block $B1_1$ is received by the first H-ARQ processor $P1_{UE}$, the processor $P1_{UE}$ determines whether or not it was received without error. If the data block $B1_1$ was received without error, the first H-ARQ processor $P1_{UE}$ transmits an acknowledgment (ACK) to indicate to the transmitting H-ARQ processor $P1_B$ that it has been successfully received. On the contrary, if there is an error in the received data block $B1_1$, the receiving H-ARQ processor $P1_{UE}$ transmits a negative acknowledgment (NACK) to the transmitting H-ARQ processor $P1_B$. This process continues until the transmitting processor $P1_B$ receives an ACK for the data block $B1_1$. Once an ACK is received, that processor $P1_B$ is "released" for processing another data block. The scheduler will assign the processor $P1_B$ another data block if available.

As graphically illustrated in FIG. 1, the scheduler knows of the release of the processor $P1_B$ by receiving the ACK/NACK, or may use some other signaling scheme that is well known in the art.

Once the receiving H-ARQ processors $P1_{UE}$–$P5_{UE}$ process each data block, they are forwarded to the reordering buffers $R_1$, $R_2$, $R_3$ based on their priority; one reordering buffer for each priority level of data. For example, Priority 1 data block $B1_1$–$B1_N$ will be received and reordered in the Priority 1 reordering buffer $R_1$; Priority 2 data blocks $B2_1$–$B2_N$ will be received and reordered in the Priority 2 reordering buffer $R_2$; and the Priority 3 data blocks $B3_1$–$B3_N$ will be received and reordered by the Priority 3 reordering buffer $R_3$. Due to the pre-processing of the data blocks by the receiving H-ARQ processors $P1_{UE}$–$P5_{UE}$ and the ACK/NACK acknowledgement procedure, the data blocks are often received in an order that is not sequential with respect to their TSNs. The reordering buffers $R_1$–$R_3$ receive the out-of-sequence data blocks and attempt to reorder the data blocks in a sequential manner prior to forwarding onto the RLC layer. For example, the Priority 1 reordering buffer $R_1$ receives and reorders the first four Priority 1 data blocks $B1_1$–$B1_4$. As the data blocks are received and reordered, they will be passed to the RLC layer.

On the receiving side, the UE MAC-hs, (which has been graphically illustrated as MAC-hs control), reads the H-ARQ processor ID, whether it is sent on a control channel such as the HS-SCCH or whether the data block has been tagged, to determine which H-ARQ processor $P1_{UE}$–$P5_{UE}$ has been used. If the UE receives another data block to be processed by the same H-ARQ processor $P1_{UE}$–$P5_{UE}$, the UE knows that that particular H-ARQ processor $P1_{UE}$–$P5_{UE}$ has been released regardless of whether or not the previous data block processed by that H-ARQ processor $P1_{UE}$–$P5_{UE}$ has been successfully received or not.

This process has several drawbacks that can cause a reordering buffer to "stall;" whereby the reordering buffer continues to wait for a data block which may never be transmitted. For example, referring to the Priority 2 reordering buffer $R_2$, the third data block $B2_3$ is missing. Using the current process, the reordering buffer $R_2$ will initiate a timer when the subsequent data block $B2_4$ is received. The reordering buffer $R_2$ will wait a predetermined duration as set by the timer to receive the missing data block $B2_3$ until the timer "times out." If it does not receive that data block after the "time out," it forwards the data blocks $B2_1$–$B2_4$, as well as subsequent data blocks up to the first missing data block, to the RLC layer. The RLC layer can then perform higher level processing to recover the missed data block.

There are several scenarios which increase the probability of reorder buffer stalling. For example, there are scenarios that data blocks of higher priority preempt data blocks of lower priority in H-ARQ transmissions; in this case, a H-ARQ process is released to serve a data block of higher priority regardless of whether the transmission of the data block of lower priority is not successful. The reordering buffer cannot tell whether a missing data block has been preempted by a higher priority data block or whether the data block is still in H-ARQ transmission. For example, the Priority 2 reordering buffer $R_2$ does not know whether its third data block $B2_3$ was preempted by one of the Priority 1 data blocks $B1_1$–$B1_4$ or whether its data block $B2_3$ is still in transmission. Where its third data block $B2_3$ was preempted and no data block was received with the same H-ARQ processor as that of the data block $B2_3$ within the predetermined duration, the Priority 2 reordering buffer $R_2$ must wait the entire timeout period before forwarding the information to upper layers for further processing.

A second scenario which increases the probability of stalling occurs during low to medium load conditions. When the UE is receiving a lower volume of data blocks, the new incoming data blocks are slow to flush the reordering buffer. For example, referring to the Priority 3 reordering buffer $R_3$, the reordering buffer $R_3$ does not know the status of the next data block $B3_4$, It may have been preempted by a higher priority data block, the transmission of the data block $B3_4$ may have failed or data block $B3_3$ may be the last data block in the sequence of data blocks $B3_1$–$B3_N$. If the data block $B3_5$ is received before data block $B3_4$, a timer is initiated. However, if low to medium load conditions are present or the data is at the end of a file transfer, there are no more data blocks that may use the same H-ARQ processor as $B3_4$. The UE will have difficulty determining whether $B3_4$ is abandoned. In this case, the Priority 3 reordering buffer $R_3$ must wait the entire "timeout period" before forwarding the information to upper layers for further processing.

Finally, since the air interface is not completely reliable, a NACK, which is somehow transformed or interpolated as an ACK by the transmitting H-ARQ processors $P1_B$–$P5_B$ will mean that the transmission of the particular data block has failed and will not subsequently be re-transmitted. The reordering buffers $R_1$–$R_3$ do not know of this miscommunication and the lost data block. The reordering buffers will again become stalled waiting for a timer to indicate the occurrence of a missing data block.

Although these scenarios are somewhat alleviated by the MAC-hs layer which instructs the particular reordering buffer $R_1$–$R_3$ to forward data to higher layers when a receiving H-ARQ processor $P1_{UE}$–$P5_{UE}$ has been released, this is only a minimal improvement.

SUMMARY OF THE INVENTION

The present invention uses a Last-In-First-Out (LIFO) policy for loading the transmitting H-ARQ processors. A scheduler assigns the next sequential data block to the most recently released H-ARQ processor. The LIFO loading policy increases the probability that the UE will be able to determine at an earlier time whether the missed TSN is due to delay in retransmission or due to the release of a transmission by the Node B by reading the new H-ARQ processor identifier (ID). Once the UE MAC-hs receives a new TSN with the same H-ARQ processor ID, the missed data block with the old TSN is forwarded to the higher layer processes to take the appropriate action for data block recovery.

DETAILED DESCRIPTION OF THE PREFERRED EMBODIMENTS

Figure 1:
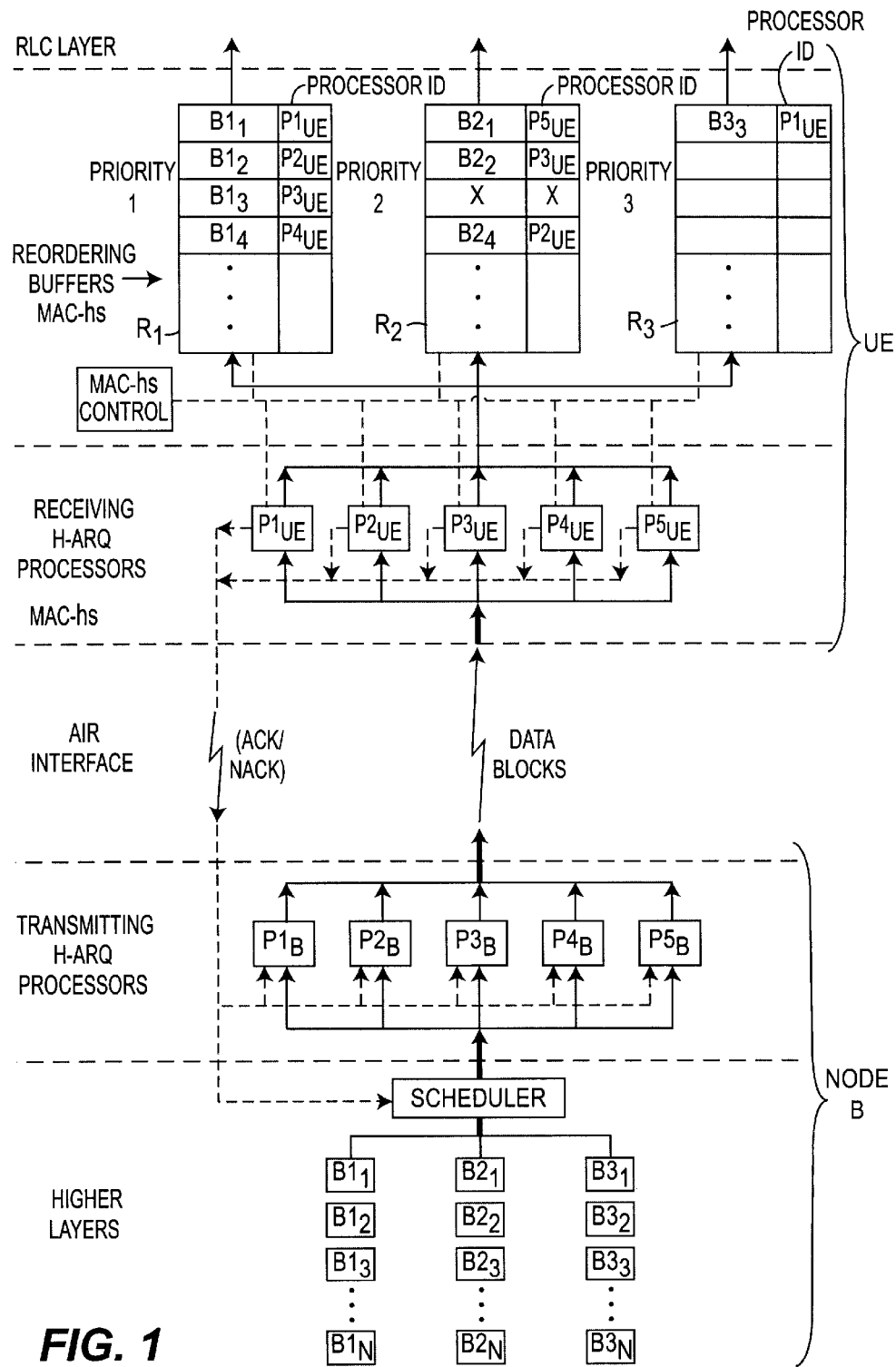
FIG. 1 is simplified block diagram of the data flow between a Node B and a UE.

The preferred embodiments will be described as referenced to the drawing figures where like numerals represent like elements throughout.

Figure 2A:
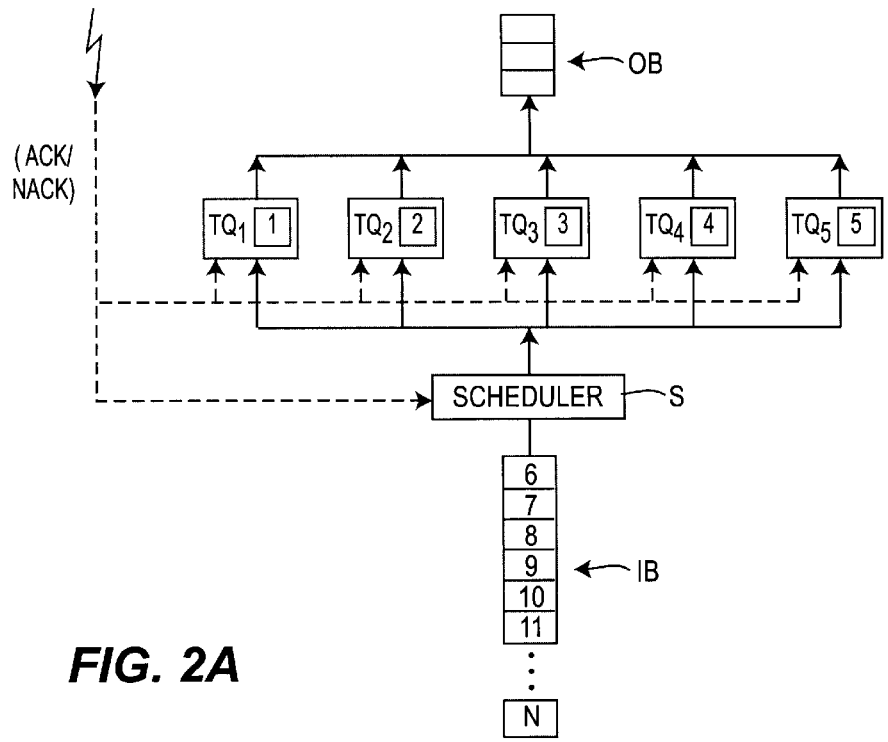
FIGS. 2A–2C are block diagrams showing the scheduling of data blocks between different transmit H-ARQ processors.

Referring to FIG. 2A, it is shown the H-ARQ processors on the transmitting side $TQ_1$–$TQ_5$ (hereinafter "transmit processors"). Although five (5) transmit processors $TQ_1$–$TQ_5$ are shown, it should be understood by those skilled in the art that any number of transmitting processors could be used in accordance with the teachings of the present invention.

An input buffer IB feeds protocol data units 1–N into the transmit H-ARQ processors $TQ_1$–$TQ_5$ through a scheduler (s). As will be explained in further detail hereinafter, the schedulers provides overall control regarding to which processor $TQ_1$–$TQ_5$ a data block is routed. It should also be understood that although the present invention will be explained with reference to functional blocks in the figures, some functions of the invention are implemented in hardware while others are implemented in software. Accordingly, the present invention should not be specifically limited to discrete components shown in the figures. For example, although the MAC-hs control is graphically illustrated in FIG. 4 as a distinct entity, it is actually implemented as the MAC-hs software layer in the UE.

Figure 4:
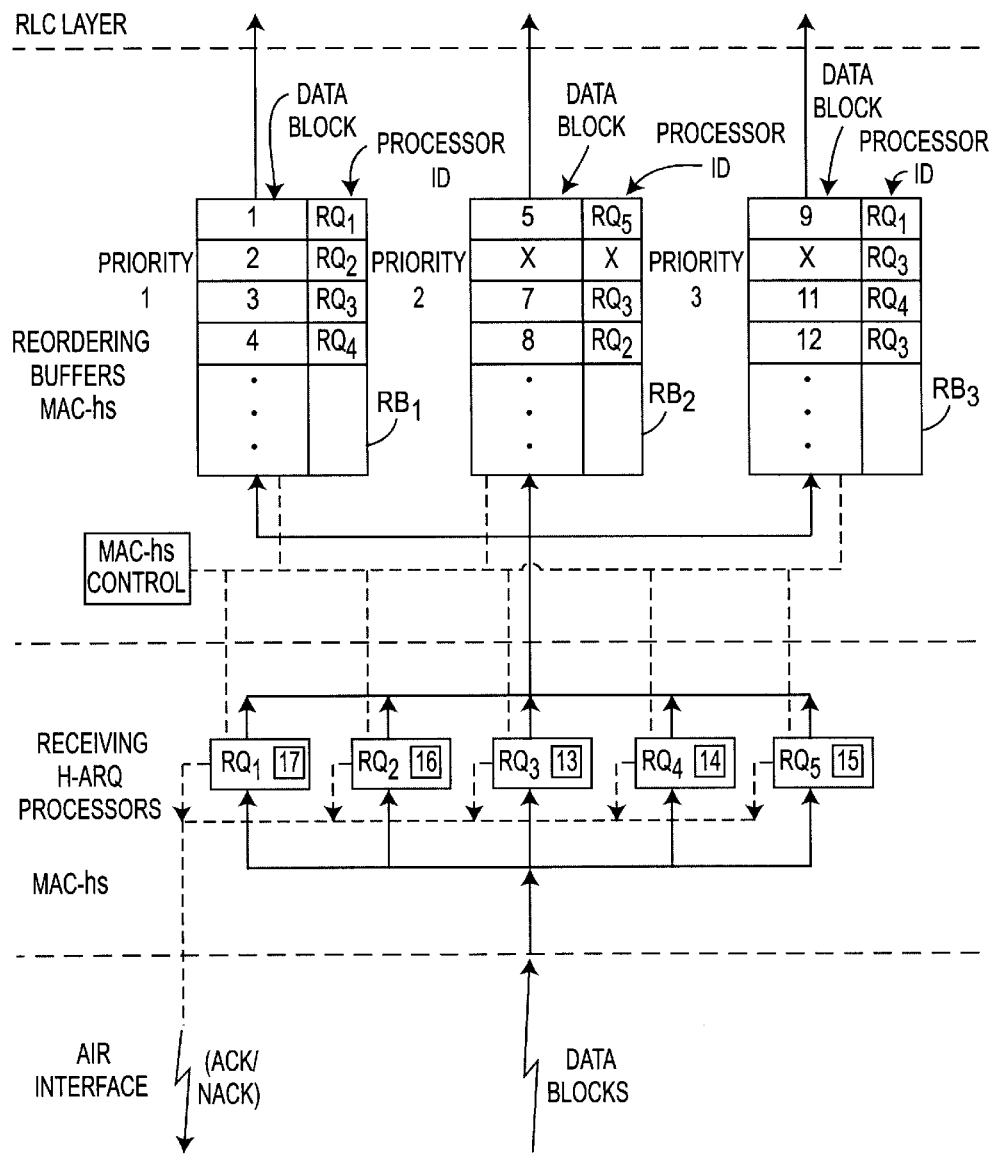
FIG. 4 is a block diagram of the receiving H-ARQ process in the UE.

After a data block is scheduled to be processed by a particular transmit processor $TQ_1$–$TQ_5$, each data block is associated with a processor ID which identifies which processor $TQ_1$–$TQ_5$ has processed the data block. This identification may be in the form of a tag as shown in FIG. 4 or may comprise control channel signaling, (such as on the HS-SCCH channel), which is signaled from the Node B to the UE. The transmit processors $TQ_1$–$TQ_5$ process the data blocks in accordance with H-ARQ processes which are well known in the art. As such, the H-ARQ process will only be explained herein to the extent necessary to explain the present invention.

Figure 2B:
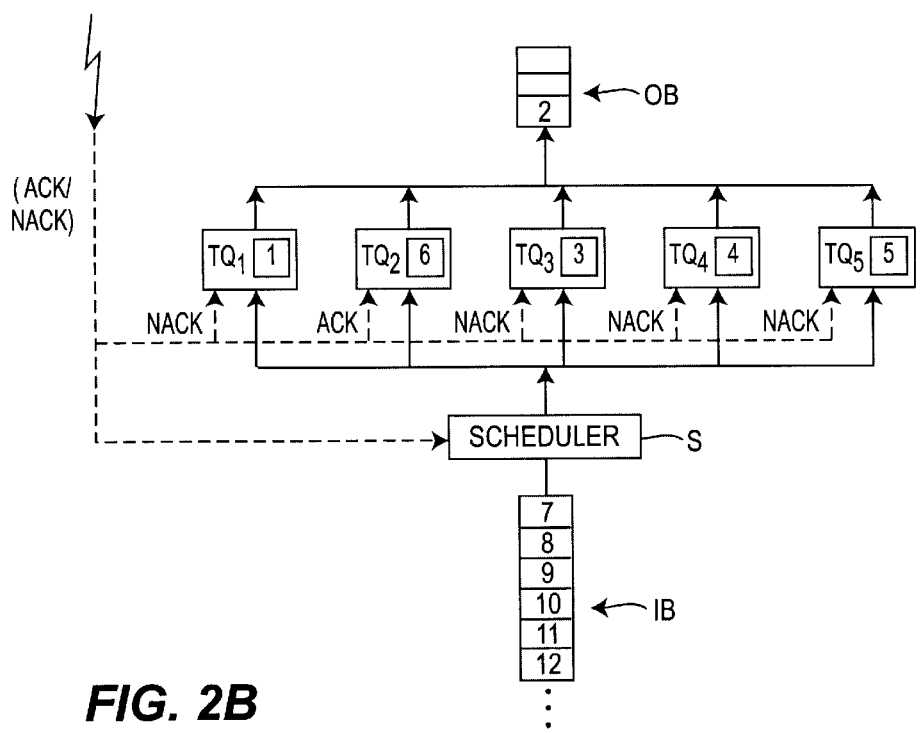

As each data block is processed by a transmit processor $TQ$–$TQ_5$, it is received by a corresponding processor on the receiving side $RQ_1$–$RQ_5$ (hereinafter receiving processors). For example, data block 2 is being processed by the second transmit processor $TQ_2$, which awaits an ACK or a NACK from its corresponding receive processor $RQ_2$, (shown in FIG. 4). If the transmit ARQ processor $TQ_2$ receives a NACK, it re-transmits the data block. If it receives an ACK, that processor $TQ_2$ is released to accept a new data block from the schedulers. This is graphically illustrated in FIG. 2B, wherein the second transmit processor $TQ_2$ is released after receiving an ACK from the receive processor $RQ_2$. Accordingly, the second transmit processor $TQ_2$ is able to accept and process the next data block; data block 6.

Figure 2C:
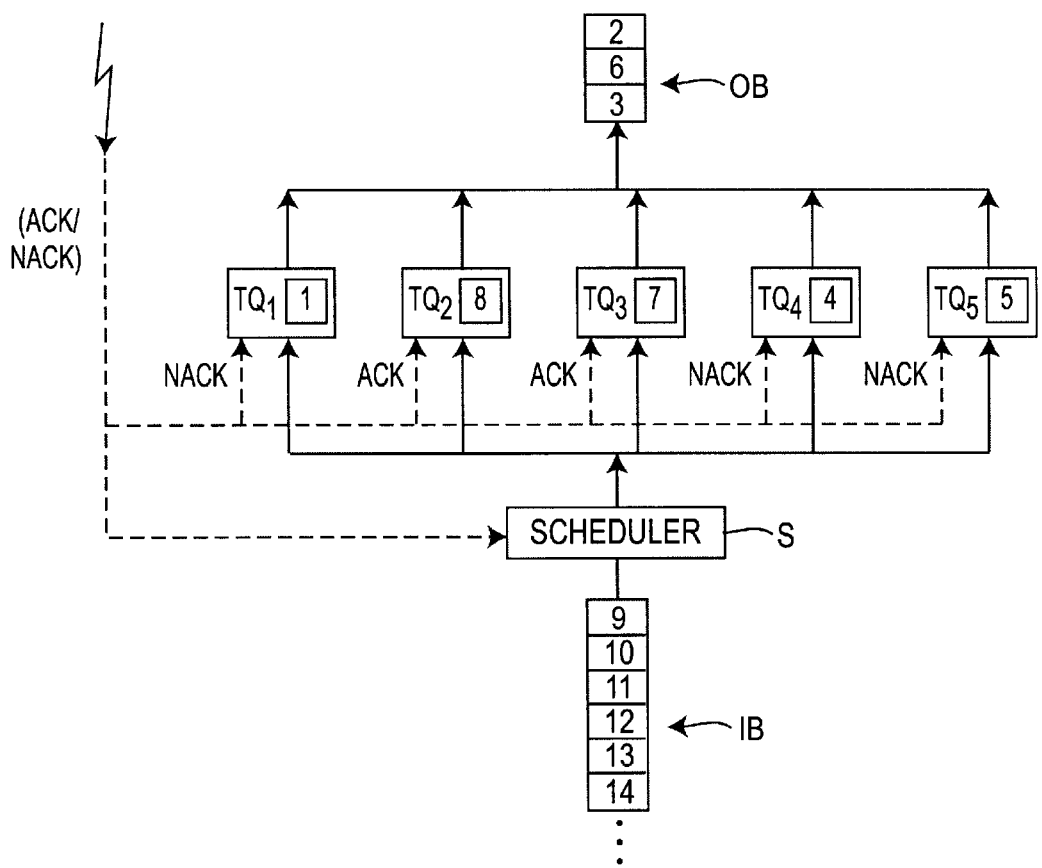

Simultaneously, all of the other transmit H-ARQ processors $TQ_1$, $TQ_3$, $TQ_4$, and $TQ_5$ continue to process their respective data blocks 1, 3, 4 and 5 until they receive an ACK. Referring to FIG. 2C, the second transmit H-ARQ processor $TQ_2$ receives an ACK regarding data block 6 and then the third transmit processor $TQ_3$ receives an ACK regarding data block 3. Since the third transmit processor $TQ_3$ was released last, (i.e., the second transmit H-ARQ processor $TQ_2$ was released first and then the third transmit processor $TQ_3$ was released), in accordance with the present invention the third transmit processor $TQ_3$ will receive the next data block; in this case, data block 7. The second transmit processor $TQ_2$ will receive the next data block; in this case, data block 8.

Figure 3A:
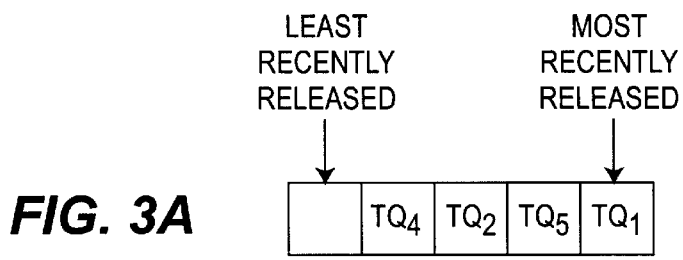
FIGS. 3A–3E are block diagrams illustrating the scheduling of transmit processors in a LIFO scheduling policy.
Figure 3B:
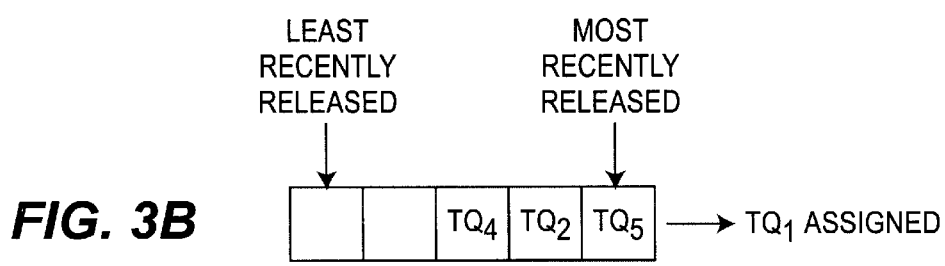
Figure 3C:
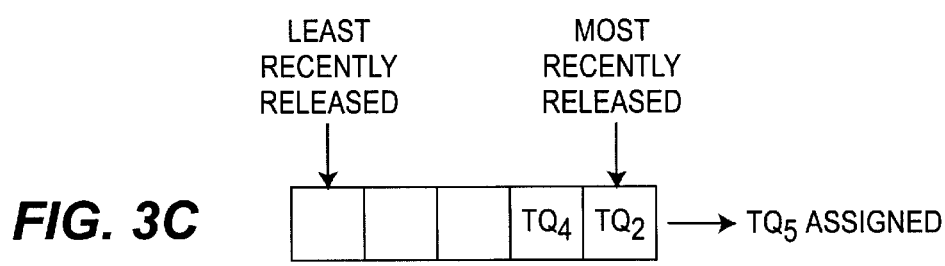
Figure 3D:
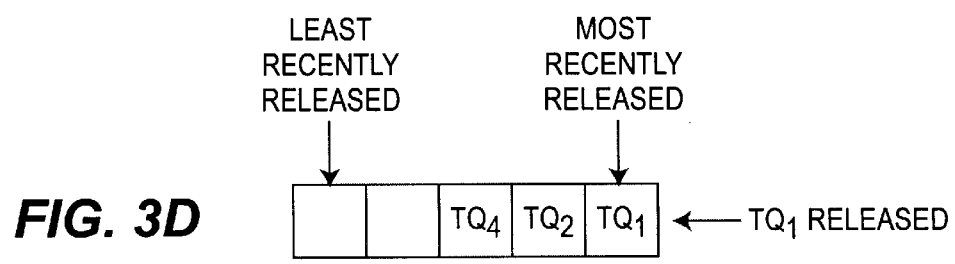
Figure 3E:
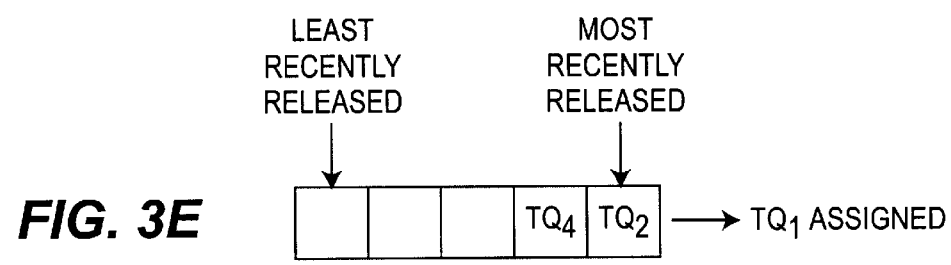

Referring to FIGS. 3A–3E, the scheduling of transmit processors $TQ_1 TQ_5$ is graphically illustrated as a buffer. However, it should be noted that there may be many physical ways of implementing a LIFO policy. The LIFO scheduling policy dictates that the last processor that has been released will be the first processor to be used next. In the example shown in FIG. 3A, the processors were released in the following order: first $TQ_4$, then $TQ_2$, then $TQ_5$ and then $TQ_1$. Accordingly, the processors will be assigned using a LIFO policy which dictates that $TQ_1$, will be assigned first followed by $TQ_5$, $TQ_2$, and $TQ_4$. Referring to FIG. 3B, once $TQ_1$ is assigned, $TQ_5$ is the next processor to be used as shown in FIG. 3C and then $TQ_2$, followed by $TQ_4$. However, this process is dynamic. As shown in FIG. 3D, $TQ_1$ may have been re-released before $TQ_2$ and $TQ_4$ are assigned. Accordingly, in accordance with the LIFO policy, $TQ_1$ will be assigned as shown in FIG. 3E prior to $TQ_2$ and $TQ_4$.

Referring to FIG. 4, a receiver made in accordance with the present invention is shown. Although the receiver includes a plurality of receive processors $RQ_1$–$RQ_5$ and a plurality of reordering buffers $RB_1$–$RB_3$, the receive processors $RQ_1$–$RQ_5$ and buffers $RB_1$ and $RB_3$ are scheduled and released in a different manner than the prior art as will be explained in detail hereinafter.

As each receive processor $RQ_1$–$RQ_5$ receives a data block, it processes the data block and sends an ACK or a NACK as appropriate, (as is performed in the prior art). Once a data block has been determined to be free from error, it is forwarded to the appropriate reordering buffer $RB_1$–$RB_3$. For example, data blocks 1, 2, 3 and 4 have been forwarded to the Priority 1 reordering buffer $RB_1$.

The H-ARQ processor ID is forwarded along with the data block. The H-ARQ processor ID is reviewed by the receiving MAC-hs to determine which transmit processor $TQ_1$–$Q_5$ was used prior to transmission, and thus which corresponding receive processor $RQ_1$–$RQ_5$ should process the data block. The H-ARQ processor ID can also be used by the MAC-hs to tell whether an H-ARQ receiving processor $RQ_1$–$RQ_5$ has been released, regardless of whether or not a data block is received successfully.

The MAC-hs control can use the H-ARQ processor ID to determine whether or not a missing data block (i.e. a missing TSN) is due to a failed transmission due to a problem with the priority level of the data. For example, referring to FIG. 4, in the Priority 2 reordering buffer $RB_2$, data block 6 is missing. Since the MAC-hs control knows via the processor ID that data block 6 was processed by the second receive processor $RQ_2$, when data block 7 is received and its processor ID states that it was processed by the second receive processor $RQ_2$, the MAC-hs control knows that the second receive processor $RQ_2$ will not be forwarding data block 6 since it has already processed a subsequent data block; (i.e. data block 7). Data blocks 5 and 7 will be forwarded to the RLC layer without further delay for error correcting and processing. Accordingly, once the UE MAC-hs receives a new TSN with the same process identity, the missing data block with the old TSN is forwarded to higher layers to let the higher layers react to the missing data block. As aforementioned, the transmit processors $TQ_1$–$TQ_5$ and the receive H-ARQ processors $RQ_1$–$RQ_5$, will be scheduled in accordance with the LIFO scheduling policy.

The present invention reduces the average latency of reordering buffers which are stalled, by reducing the average time interval from the scheduling of a data block to an H-ARQ process to the time the same H-ARQ process is free to process another data block. Therefore, the MAC-hs control can detect a missing data block earlier by reading the H-ARQ process ID of subsequent data block(s) and correlating the TSNs of the data blocks.

The invention is most effective when only some of the H-ARQ processes are utilized. For example, referring to FIGS. 3A–3E, if the data block assigned to $TQ_1$ in FIG. 3D is missing, without the present invention the schedulers may choose $TQ_5$ for the next data block and wait until the timer expires to forward any subsequent in-sequence delivery data blocks to higher layers. In contrast, with the present invention, $TQ_1$ is assigned the next data block and the MAC-hs control can earlier detect that the previous data block is missing since the same H-ARQ process ID is received and the MAC-hs control can then react appropriately.

The present invention impacts current communication systems in two ways. On the transmitting side, the system requires a LIFO in the scheduling policy; which is typically implemented in the scheduling/priority handling entity in the Node B MAC-hs. The transmitting side will maintain the status of the releasing order of H-ARQ processors such that LIFO characteristics are achieved. The LIFO policy should be coordinated with an existing functionality on the receiving side. On the receiving side, incoming data blocks in the reordering buffers will be examined. If there is a missing data block, forwarding of data blocks to higher layers will only be permitted upon the receipt of a new TSN with the same processor ID as the missing data block.

Figure 5:
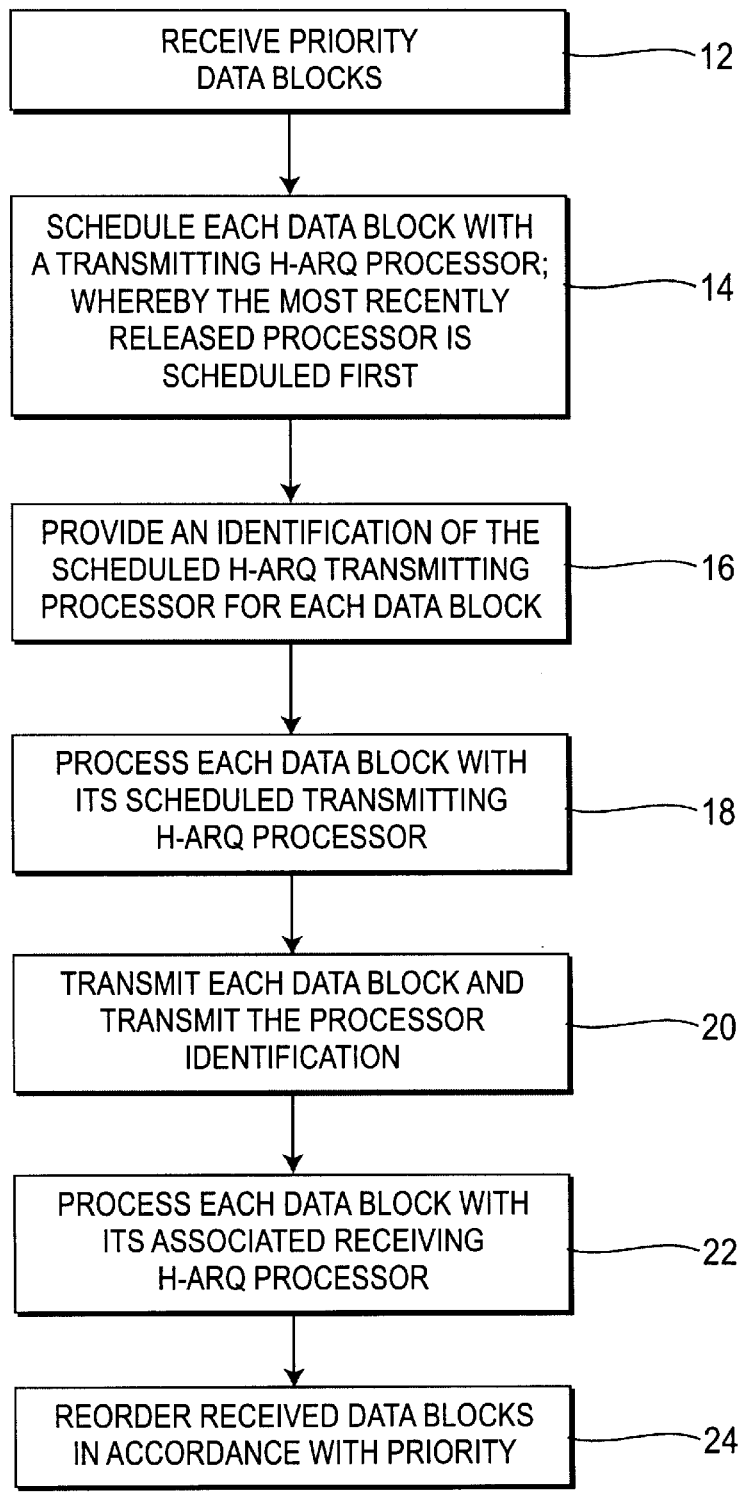
FIG. 5 is a method of processing a data block in accordance with the present invention.

Referring to FIG. 5, a method 10 of processing a data block in accordance with present invention is shown. The method 10 commences with a scheduler receiving prioritized data blocks (step 12). The scheduler then schedules each data block with a transmitting H-ARQ processor; whereby the most recently released processor is scheduled first (step 14). This implements the LIFO scheduling policy. Next, an identification of the scheduled H-ARQ transmit processor is provided for each data block (step 16). As aforementioned, this may be provided with each data block, or may be signaled separately from the data block. Each data block is processed with its scheduled transmitting H-ARQ processor (step 18) and is then transmitted with the processor ID (step 20). On the receiving end, each data block is processed with the receive processor corresponding to the scheduled transmit processor (step 22). The properly received data blocks are reordered in accordance with their priority (step 24).

The present invention results in optimization performance since the average latency of reordering buffers which are stalled will be reduced, and the reordering buffers will less likely to stall while waiting for subsequent data blocks which will never be received.

Although the present invention has been described in detail, it is to be understood that the invention is not limited thereto, and that various changes can be made therein without departing from the spirit and scope of the invention, which is defined by the attached claims.

What is claimed is:

1. A system for transmitting a plurality of data streams, each of said plurality of data streams having a sequence of data blocks, the system comprising:

a plurality of H-ARQ transmit processors, each for processing a data block for transmission;

a scheduler, for receiving said data streams, for assigning data blocks to one of said plurality of HARQ transmitting processors and for associating a process identity to each of said plurality of data blocks, the process identity corresponding to the H-ARQ transmit processor which processes the data block;

a plurality of H-ARQ receive processors, each for receiving a data block from a corresponding H-ARQ transmit processor and for acknowledging the receipt of a data block to said corresponding H-ARQ transmit processor; and a plurality of reordering processors, each for ensuring the sequence of blocks for at least one of said data streams, whereby an H-ARQ transmit processor is released once it has processed a data block without errors and said scheduler schedules the most recently released H-ARQ transmit processor first.

2. The system of claim 1 wherein the reordering processors detect said process identities of each data block to determine if there are missing data blocks.

3. The system of claim 2 wherein said scheduler assigns a sequential transmission sequence number (TSN) relating to said sequence.

4. The system of claim 2 wherein a missing data block is detected when the received TSNs are not sequential.

5. The system of claim 4, further including a controller, which determines whether a missing data block is a failed transmission or a delayed transmission.

6. The system of claim 5, whereby failed transmission is determined if an H-ARQ receive processor process a subsequent data block.

7. The system of claim 1 wherein each said process identity is a tag associated with each of said plurality of data blocks.

8. The system of claim 1 wherein each said process identity comprises data transmitted via a separate control channel.

9. The system of claim 1 whereby the data blocks are transmitted over a high speed downlink shared channel.

10. A method for avoiding stalls in an H-ARQ reordering buffer of a receiver, comprising:

receiving a plurality of data blocks in a predetermined sequence;

scheduling each of said plurality of data blocks to be processed by one of a plurality of transmit H-ARQ processors;

associating an identification of each transmit H-ARQ processor with each data block that the transmit H-ARQ processor processes;

transmitting each data block along with its associated identification;

reordering each of a plurality of data blocks according to said sequence; and releasing a transmit H-ARQ processor for subsequent scheduling when the data block it is processing is successfully transmitted; whereby the most recently released transmit H-ARQ processor is scheduled first.

11. The method claim 10 wherein the reordering step further includes determining when a data block is out of sequence.

12. The method of claim 10 wherein said identification is sent via a control.

13. The method of claim 10 wherein said identification is a tag that is sent with said data block.

* * * * *

UNITED STATES PATENT AND TRADEMARK OFFICE
CERTIFICATE OF CORRECTION

PATENT NO. : 6,693,910 B2
DATED : February 17, 2004
INVENTOR(S) : Yl-Ju Chao

It is certified that error appears in the above-identified patent and that said Letters Patent is hereby corrected as shown below:

<u>Title page,</u>
Item [56], References Cited, U.S. PATENT DOCUMENTS, insert
-- 5,828,677   10/1998   Sayeed et al.
   5,940,769   08/1999   Nakajlma et al.
   6,138,260   10/2000   Ketseoglou --.

Signed and Sealed this

Fourteenth Day of February, 2006

JON W. DUDAS
*Director of the United States Patent and Trademark Office*